United States Patent [19] [11] Patent Number: 4,831,489
Ozu et al. [45] Date of Patent: May 16, 1989

[54] CONTROL UNIT WITHDRAWING MECHANISM FOR SWICHGEARS

[75] Inventors: Tokio Ozu, Akigawa; Takasi Itagaki, Mie; Sanemi Fukuda, Kuwana, all of Japan

[73] Assignee: Kabushiki Kaisha Toshiba, Kawasaki, Japan

[21] Appl. No.: 185,438

[22] Filed: Apr. 25, 1988

[30] Foreign Application Priority Data

Jun. 26, 1987 [JP] Japan .................................. 62-158959

[51] Int. Cl.$^4$ ............................................. H02B 11/12
[52] U.S. Cl. ..................................... 361/338; 361/342; 361/391; 200/50 A
[58] Field of Search ............. 200/50 AA, 50 R, 50 A, 200/50 B; 361/331–335, 338–343, 359, 355, 361, 390–391

[56] References Cited

U.S. PATENT DOCUMENTS

| 3,142,003 | 7/1964 | Olashaw | 361/338 |
| 3,170,091 | 2/1965 | Hudson | 361/338 |
| 4,305,114 | 12/1981 | Takagi et al. | 361/342 |
| 4,308,437 | 12/1981 | Takagi et al. | 200/50 A |

FOREIGN PATENT DOCUMENTS

| 3544227 | 6/1987 | Fed. Rep. of Germany | 361/339 |
| 60-113604 | 6/1985 | Japan . | |
| 62-13374 | 4/1987 | Japan . | |

Primary Examiner—A. D. Pellinen
Assistant Examiner—Gregory D. Thompson
Attorney, Agent, or Firm—Foley & Lardner, Schwartz, Jeffery, Schwaab, Mack, Blumenthal & Evans

[57] ABSTRACT

The disclosure relates to a control unit withdrawing mechanism for metal-clad switchgears in which control units each including power load controlling equipments are withdrawably enclosed in unit compartments respectively for movement between connection and test positions. The mechanism includes a locking lever for locking the control unit to the connection and test positions when turned, a positioning aperture formed in the bottom wall of the unit compartment, and an engagement strip moved within the positioning aperture when the control unit is moved within the unit compartment and limiting the movement of the control unit to the section between the connection and test positions. The engagement strip is rotatably mounted on a rotation shaft secured to the control unit so as to be moved together with the locking lever in a predetermined section so as to enter and withdraw from the positioning aperture. Subsequently, the engagement strip further moves due to gravity in spite that the movement of the locking lever is stopped. The maximum rotational operation angle of the locking lever may be limited to about 180° while the engagement strip is moved by about 360°.

2 Claims, 8 Drawing Sheets

CONTROL UNIT WITHDRAWING MECHANISM FOR SWICHGEARS

BACKGROUND OF THE INVENTION

1. Field of the Invention

The present invention relates generally to metal-clad or -enclosed switchgears enclosing control units for controlling and monitoring loads such as electric motors to protect the loads against overload or the like, and more particularly to a control unit withdrawing mechanism for the switchgears wherein each control unit is withdrawably disposed in each unit compartment of the switchgear and locked in the position.

2. Description of Prior Art

The metal-clad switchgear such as a control center generally has a box-shaped frame and the interior thereof defined by the frame is generally divided into a plurality of unit compartments by shelves disposed horizontally. Control units are withdrawably disposed in the unit compartments respectively. Each control unit includes a moulded case circuit breaker, an electromagnetic contactor, a control relay and the like. These control equipments are mounted on a common frame in order to perform controlling, protecting and monitoring the loads and other functions. A main cirucit and a control circuit of the control center are adapted to be automatically connected to and disconnected from a circuit disposed at the frame side when the control unit is placed in and withdrawn from the unit compartment.

Several types of control unit withdrawing mechanisms are well known in the art and have advantages and disadvantages. The control unit withdrawing mechanism is required to perform the following functions:

(1) The control unit can be placed in and withdrawn from the unit compartment along a guide rail.

(2) The control unit can securely be locked in its connection position and test position on the frame.

(3) The control unit can securely be locked on the frame when occupying the connection position so as to be prevented from slipping out of place due to the occurrence of an earthquake and the like.

(4) When moved from the connection position to the test position, the control unit can securely be stopped at the test position with ease.

Figure 14:
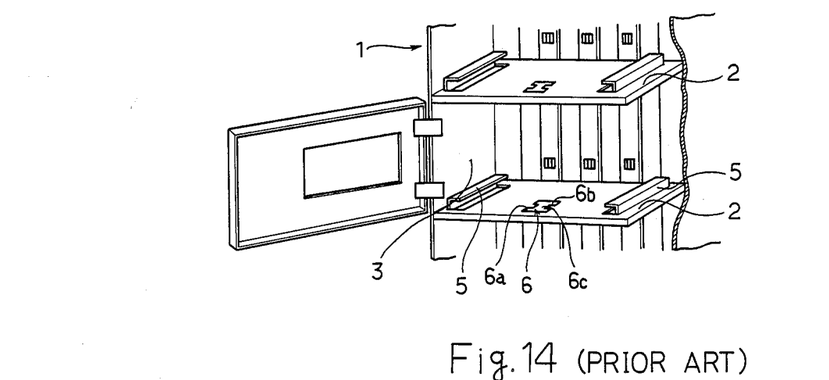
FIGS. 14, 15, 16(a), 16(b), 17(a), 17(b), 18(a), 18(b) are views employed for explaining the construction and operation of the prior control unit withdrawing mechanism.
Figure 15:
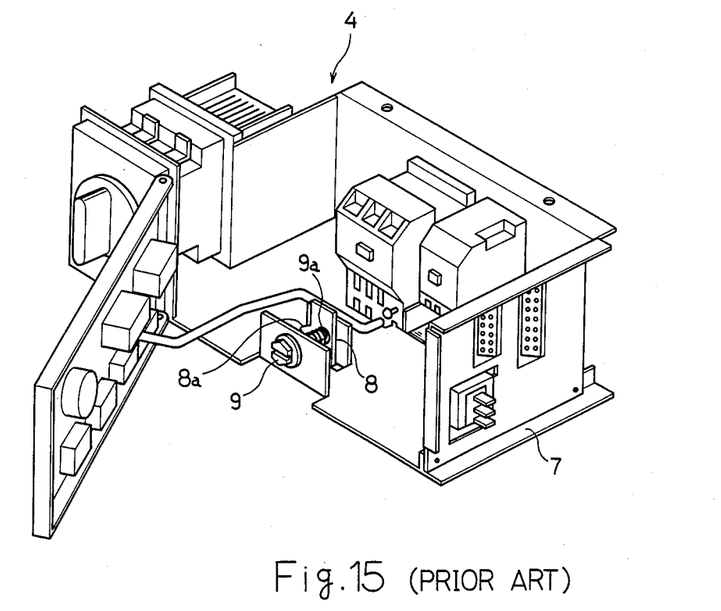

A conventional control unit withdrawing mechanism will now be described with reference to FIGS. 14 and 15. Reference numeral 1 indicates a frame of the metal-clad switchgear. The interior of the frame 1 is divided into a plurality of unit compartments 3 by shelves 2. Control units 4 are withdrawably enclosed in the unit compartments respectively. One of the control units 4 is shown in the drawing. General L-shaped guide rails 5, are secured on opposite end portions of the shelf 2 respectively. A generally H-shaped positioning aperture 6 is formed in the center of the shelf 2. The positioning aperture 6 includes relatively wide front and rear engagement regions 6a and 6b and a relatively narrow guide region 6c communicating between the front and rear engagement regions 6a and 6b. Guide strips 7 formed on opposite ends of the bottom wall of the control unit 4 respectively are withdrawably attached to the guide rails 5 so as to be slidable therealong. A lever 8 is rotatably mounted on the control unit 4. A screw 9 is threadably engaged with the lever 8. Friction due to a spring 9a causes the lever 8 to be moved together with the screw 9. This rotational movement allows the lever 8 to be engaged with the front and rear engagement regions 6a and 6b of the positioning aperture 6. The lever 8 is provided with an engagement strip 8a which is caused to enter the guide region 6c by the rotational movement of the screw 9.

Figures 16A, 16B:
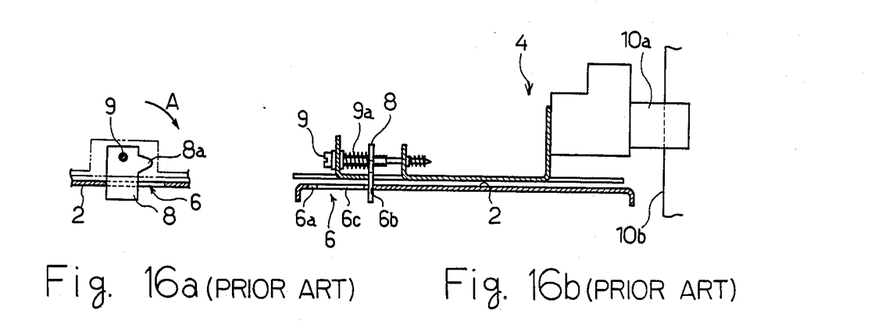
Figures 17A, 17B:
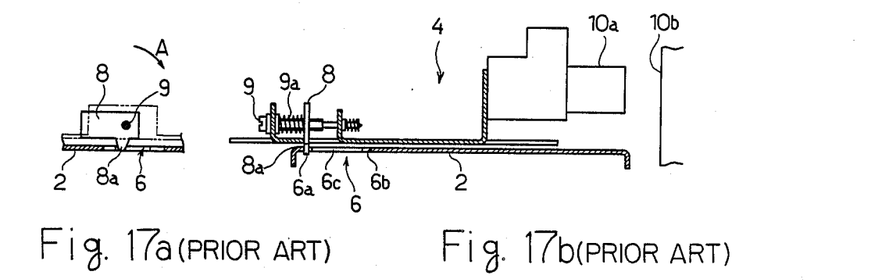
Figures 18A, 18B:
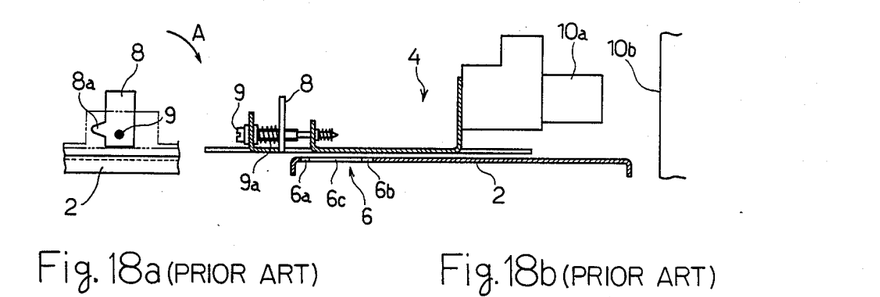

In the above-described control unit withdrawing mechanism, the control unit 4 is placed in the unit compartment 3 and then the screw 9 is threadably turned with a suitable tool in the direction of arrow A shown in FIG. 16 to thereby move the lever 8. The lever 8 is engaged with the rear engagement region 6b of the positioning aperture 6, thereby connecting a disconnector 10a of the control unit 4 to a power source bus 10b. Thus the control unit 4 is locked in the connection position. See FIGS. 16(a) and 16(b). When the control unit 4 is to be moved from the connection position to the test position (In this case, a disconnector 10a is disconnected from the power source bus 10b as shown in FIG. 17.), the screw 9 in the condition shown in FIG. 16(a) is turned by approximately 90° in the direction opposite to arrow A to thereby disengage the lever 8 from the rear engagement region 6b of the positioning aperture 6. The screw 9 is further turned by approximately 180° in the direction opposite to arrow A to thereby cause the engagement strip 8a to enter the guide region 6c of the positioning aperture 6. When the control unit 4 is withdrawn toward the test position, the engagement strip 8a is moved along the guide region 6c and collides with the end surface of the front engagement region 6a, thereby positioning the control unit 4 at the test position. See FIGS. 17(a) and 17(b). Subsequently, when the screw 9 is turned by approximately 270° in the direction of arrow A, the lever 8 is engaged with the front engagement region 6a of the positioning aperture 6, thereby locking the control unit 4 in the test position. When the control unit 4 is to be withdrawn from the unit compartment 3, the lever 8 is turned so as to be positioned as shown in FIG. 18(a) and subsequently, the control unit 4 is withdrawn. See FIG. 18(b).

In relation to the above-described conventional construction to the aforementioned functions required for the control unit withdrawing mechanism, the functions (1)–(3) are performed by the conventional mechanism. The function (4), however, cannot be desirably performed in a reliable manner by the conventional control unit withdrawing mechanism. That is, the screw 9 is required to be turned in the range of wide angle (approximately 270°) in the event that the control unit 4 is moved from the connection position to the test position. Consequently, troublesome operation of the lever 8 is required. Further, since the screw 9 is required to be turned in the range of wide angle, the turning of the screw 9 with the tool would be suspended although the engagement strip 8a of the lever 8 is not actually inserted in the guide region 6c. In this case, since the control unit 4 is not properly positioned, the control unit 4 can be moved over the test position and fall out of the unit compartment 3.

Furthermore, the prior control unit withdrawing mechanism is not provided with means for preventing the control unit from being moved between the connection and test positions in the condition that the moulded case circuit breaker is electrically closed. Accordingly, the control unit may be moved even where the moulded case a circuit breaker is electrically closed, resulting in a serious hazard.

SUMMARY OF THE INVENTION

Therefore, a primary object of the present invention is to provide a control unit withdrawing mechanism for metal-clad switchgears wherein each control unit can securely be placed and locked in the test position with ease when the control unit is moved from the connection position to the test position.

A second object of the present invention is to provide a control unit withdrawing mechanism for metal-clad switchgears wherein the control unit can be prevented from being inadvertently moved from either the connection position or test position to the other in the event that the moulded case circuit breaker is electrically closed.

In order to attain the primary object, the control unit withdrawing mechanism of this invention comprises means for positioning the control unit at the respective connection and test positions, the positioning means comprising a positioning aperture formed in a bottom wall of the control unit and having a predetermined length, and an engagement strip moving within the positioning aperture when the control unit is moved within the unit compartment, thereby limiting the movement of the control unit to a section between the connection and test positions. Locking means for locking the control unit in either the connection or test position comprises front and rear engagement regions formed in the bottom wall of the control unit so as to correspond to the test and connection positions respectively and a locking member mounted on the control unit for reciprocal rotational movement and moved when the control unit occupies either the test or connection position, thereby engaging the front or rear engagement region to lock the control unit in the position. Furthermore, the engagement strip is rotatably mounted on a shaft at the control unit side so as to be moved in response to the rotational movement of the locking member to thereby enter and withdraw from the positioning aperture. When passing a predetermined point, the engagement strip further moves owing to its own gravity even after the rotational movement of the locking member is stopped, thereby being allowed to enter the positioning aperture.

When the control unit is set in the unit compartment, occupying either the connection or test position, the rotational movement of the locking member causes the control unit to be locked in the position when the locking member is moved and engages either the rear or front engagement region. In the case that the control unit is to be moved between the connection and test positions, the locking member is moved so as to disengage from either the rear or front engagement region. The engagement strip is also moved together with the locking member. In spite that the rotational movement of the locking member is stopped when the locking member passes a predetermined point, the engagement strip is caused to further move owing to its own gravity, whereby the engagement strip is allowed to enter the positioning aperture. Accordingly, the movement of the control unit may be limited to the section between the connection and test positions, thereby locking the control unit in the respective positions. Consequently, the movement of the engagement strip owing to its own gravity reduces the rotative movement angle of the locking member.

In order to attain the second object, the control unit withdrawing mechanism comprises an engagement member provided at the control unit side for reciprocal movement in response to on-off operation of an operation handle of the moulded case circuit breaker and a locking region provided at the unit compartment side so as to correspond to the connection position of the control unit. The engagement member, when moved, engages and disengages from the locking region. The control unit is automatically locked in the connection position when the moulded case circuit breaker is electrically closed. The control unit may be moved from the connection position when the circuit breaker is electrically opened, releasing the locking.

Other and further objects of the present invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENT

An embodiment of the control unit withdrawing mechanism in accordance with the present invention will be described with reference to FIGS. 1–14.

Figure 1:
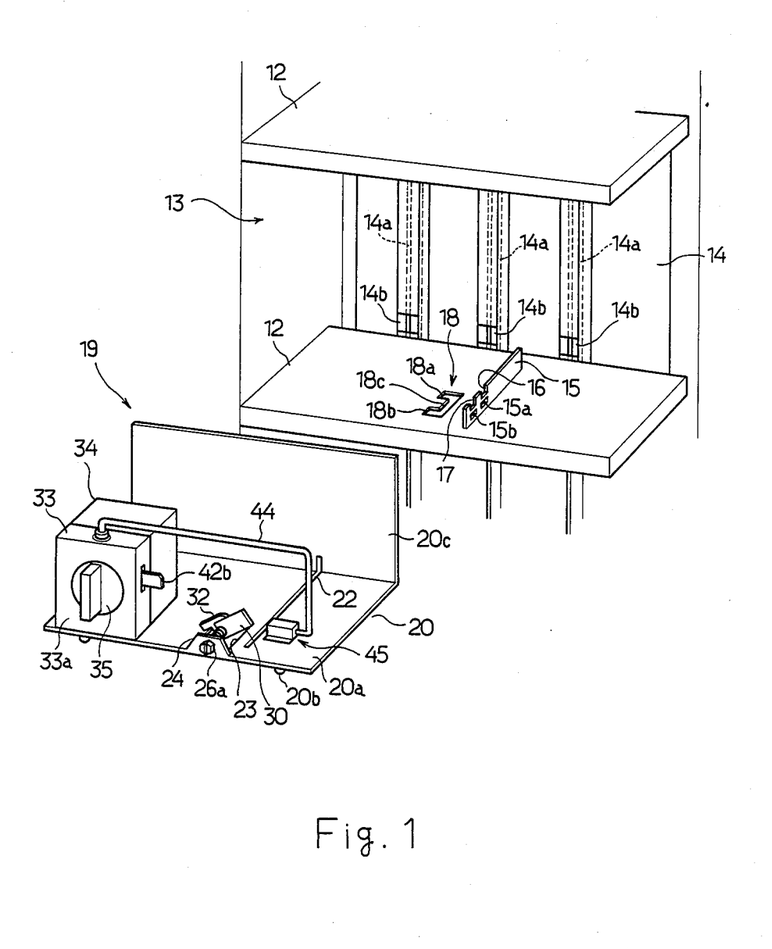
FIG. 1 is a perspective view of the unit compartment with the control unit withdrawn therefrom.
Figure 2:
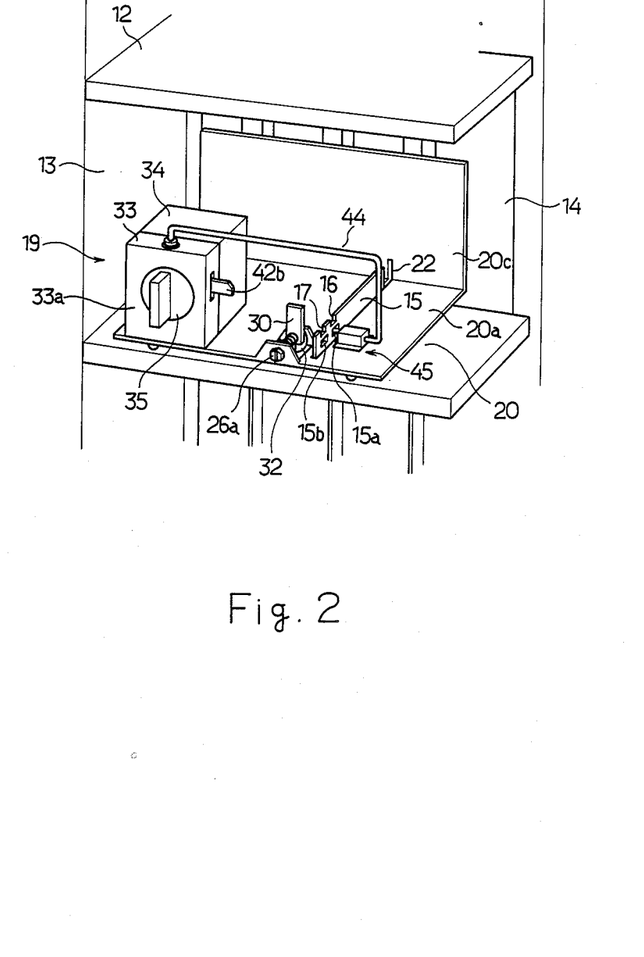
FIG. 2 is a perspective view of the unit compartment with the control unit enclosed therein.
Figure 3:
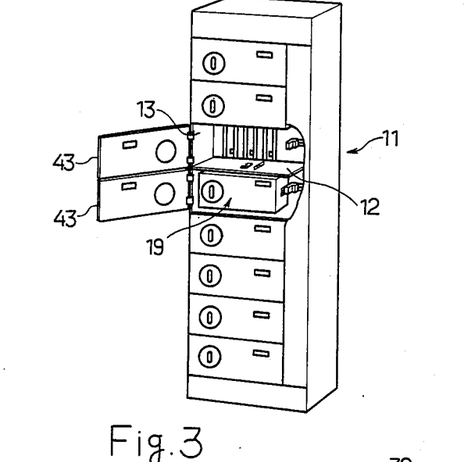
FIG. 3 is a perspective view of the control unit.
Figure 4:
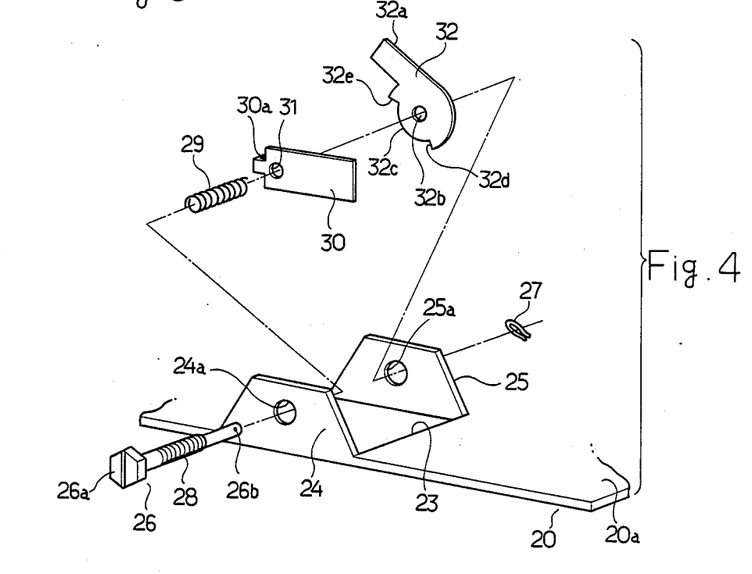
FIG. 4 is an enlarged exploded view of major part of the control unit withdrawing mechanism in accordance with the present invention.
Figure 5:
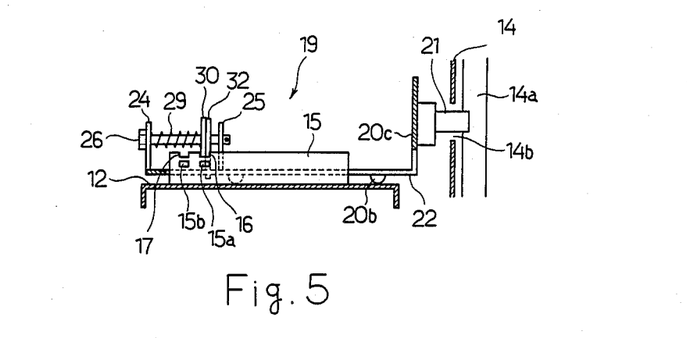
FIGS. 5–7 are side views of the control unit employed for explaining the operation of the locking member.

Referring first to FIGS. 1–3, reference numeral 11 indicates a box-shaped frame of a metal-clad or -enclosed switchgear. The interior of the switchgear is divided into a plurality of unit compartments 13 by shelves 12 disposed horizontally. Three buses 14a each connected to an electric power system (not shown) are vertically disposed at the backside of the unit compartment 13 and covered with suitable bus covers 14 respectively. Each bus cover 14 is provided with an opening 14b facing the interior of the unit compartment 13. A plate-shaped guide rail 15 is secured to the upper surface of the shelf 12 and extends from the front side of the unit compartment 13 to the backside thereof. Two cutout portions are formed in the upper edge of the guide rail 15. The cutout portions serve as rear and front engagement portions 16 and 17 respectively. First and second locking openings 15a and 15b are formed below the rear and front engagement portions 16 and 17 in the guide rail 15, which locking openings constituting part of a safety lock mechanism for the control unit 19 as will hereinafter be described. A generally square U- shaped positioning aperture 18 is formed in the shelf 12. The positioning aperture 18 comprises relatively wide rear and front regions 18a and 18b and a relatively narrow guide region 18c communicating the rear and front regions 18a and 18b. A control unit 19 includes a unit frame 20 having four legs 20b projecting from the bottom plate portion thereof. The control unit 19 is placed on the shelf 12 with the legs 20b abutting on the shelf 12, whereby each control unit 19 may withdrawably be placed in the respective unit compartments 13. A contact element 21 is secured to the backside of the unit frame 20 as shown in FIG. 5. By engagement with or disengagement from the vertical bus 14a, the contact element 21 is connected to or disconnected from the vertical bus 14a through the opening 14b when the control unit 19 is placed in or withdrawn from the unit compartment 13, respectively. An elongated guide opening 22 extends from the bottom plate 20a to the lower portion of the back plate portion 20c. The guide rail 15 is inserted into the guide opening 22. An aperture 23 is formed in the bottom plate portion 20a so as to correspond to the positioning aperture 18 of the shelf 12 when the control unit is placed in the unit compartment 13. Referring to FIG. 4, an upstanding support plate 24 is provided at the front edge of the aperture 23 formed in the bottom plate portion 20a of the frame 20. Another upstanding support plate 25 is provided on the rear edge of the aperture 23 formed in the bottom plate portion 20a. A rotation shaft 26 is inserted through openings 24a and 25a formed in the support plates 24 and 25, respectively. The rotation shaft 26 has a threaded portion 28 and the head 26a thereof having a recess is located in front of the support plate 24. The end opposite to the head 26a projects in the rearward of the support plate 25. An aperture 26b is formed in part of the rotation shaft 26, which part projecting in the rearward of the support plate 25. A pin member 27 is inserted through the aperture 26b, thereby preventing the rotation shaft 26 from falling out from the unit frame 20. The rotation shaft 26 is inserted through the aperture 24a, a compression spring 29, a threaded aperture 31 of a lever 30, an aperture 32b of an engagement strip 32, and the aperture 25a in turn. The lever 30 is located in the middle of the threaded portion 28 of the rotation shaft 26. The engagement strip 32 is rotatably mounted loosely on the rotation shaft 26. The lever 30 is adapted to engage either the rear or front engagement portion 16 or 17 when the control unit 19 is moved forwardly or rearwardly, thereby serving as a locking member for locking the control unit 19 in the test or connection position. Since the lever 30 is always biased in one direction by the compression spring 29, the friction induced between the threaded aperture 31 and the threaded portion 28 takes a large value. Consequently, the lever 30 is usually moved together with the rotation shaft 26 and engages the rear and front engagement portions 16 and 17. The lever 30 is formed into a nearly rectangular plate shape and has an operation strip 30a formed by bending one end thereof in the direction of the engagement strip 32 into a generally L-shape. A tongue-shaped portion 32a of the engagement strip 32 extends from the center thereof. The wideth of the tongue-shaped portion 32a is determined so as to pass along the guide region 18c of the positioning aperture 18. A sectorial cutout portion 32c is formed in part of the outer periphery of the central portion of the engagement strip 32 and is concentric with the aperture 32b through which the rotation shaft 26 extends. The operation strip 30a of the lever 30 is adapted to enter the sectorail cutout portion 32c of the engagement strip 32 so that the operation strip 30a of the lever 30 collides with either an end 32e or 32d of the cutout portion 32c when the lever 30 is moved.

A safety lock mechanism is incorporated in a moulded case circuit breaker 34. The safety lock mechanism prevents the control unit 19 from being inadvertently withdrawn from the unit compartment 13 when the control unit 19 occupies the connection position in the unit compartment 13 with the circuit breaker 34 electrically closed. The safety lock mechanism also prevents the control unit 19 from being inadvertently moved from the test position to the connection position when the control unit 19 occupies the test position with the circuit breaker 34 electrically closed.

Figure 12:
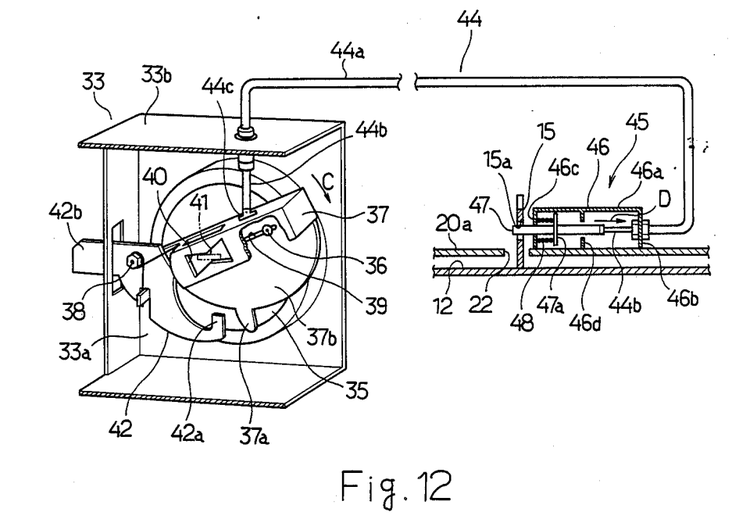
FIGS. 12 and 13 are schematic illustrations of a safety lock mechanism.
Figure 13:
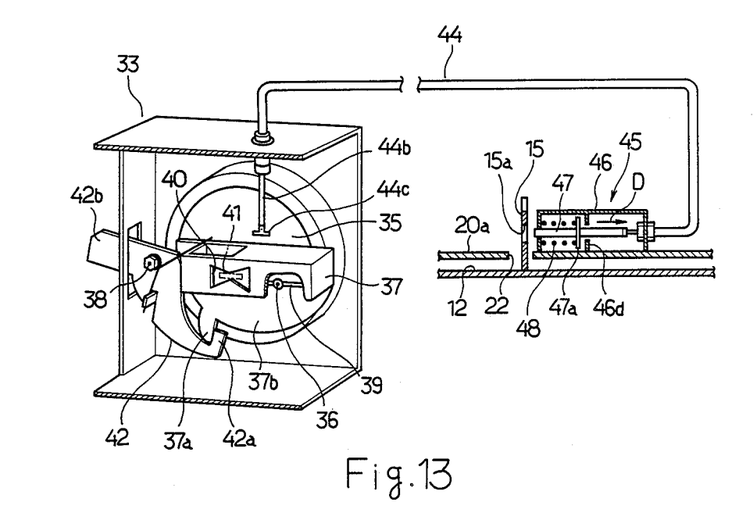

The safety lock mechanism will now be described with reference to FIGS. 1, 12 and 13. Referring to FIG. 1, a mounting panel 33 is secured to the front wall of the moulded case circuit breaker 34. An operation handle 35 is mounted on the front side 33a for on-off operation of the circuit breaker 34. A pin member 36 is moved together with the operation handle 35 as shown in FIGS. 12 and 13. An actuating member 37 having a semicircular portion 37b is rotatably mounted on a shaft 38 one end of which is secured on the left end portion of the front wall 33a of the mounting panel 33, as viewed in FIG. 12. The pin member 36 eccentrically provided on the backside of the operation handle 35 is slidably inserted in an elongated aperture 39 formed in the other end of the actuating member 37. A bow-shaped opening 40 is formed in the center of the actuating member 37. A distal end of an operation lever 41 provided for on-off operation of the circuit breaker 34 is inserted in the opening 40. An engagement member 42 is rotatably mounted on the shaft 38. A claw 42a formed at one end of the engagement member 42 engages and disengages from an engagement claw 37a formed on the semicircular portion 37b of the actuating member 37. As illustrated in FIG. 13, the other end 42b of the engagement member 42 is extended out of the mounting panel 33 through a slot and engages and disengages from a lock portion (not shown) of a compartment door 43, as in the conventional manner.

Figure 6:
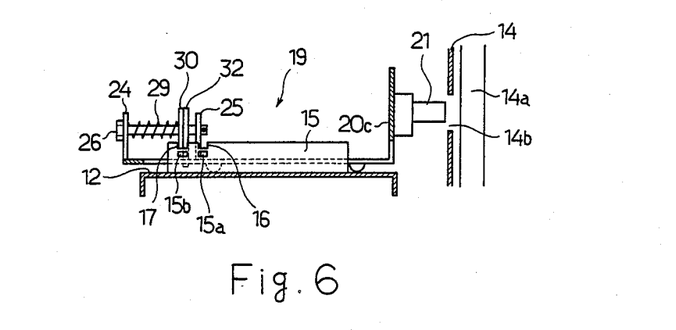

Reference numeral 44 indicates a release wire for remote controlling the safety lock mechanism. One end of an outer tube 44a of the release wire 44 is secured to the top wall 33b of the mounting panel 33. An inner tube 44b is extended inside the mounting panel 33 and one end 44c thereof is opposed to the actuating member 37. A locking means 45 is provided in the vicinity of the guide aperture 22 formed in the bottom 20a of the frame 20. The locking means 45 comprises a frame 46, an engagement member 47 and a compression spring 48. Both ends of the top wall of the frame 46 are bent so that the top wall is configured to a generally square U-shape. An intermediate panel 46d is provided between the bent end portions 46b and 46c. The other end of the outer tube 44a of the release wire 44 is secured to the end portion 46b of the top wall. The engagement member 47 is provided between the other end portion 46c and the intermediate panel 46d for reciprocal movement. The engagement member 47 is usually biased in the direction of arrow D by the compression spring 48 provided between a flange 47a projecting from the middle of the engagement member 47 and the end 46c of the mounting frame 46. The force of the compression spring 48 causes the flange 47a to usually abut against the intermediate panel 46d, whereby one end of the engagement member 47 is usually held nearly coplanar with the bent end portion 46c. The other end of the inner tube 44b is coupled to the other end of the engagement member 47. The first and second lock openings 15a and 15b formed in the guide rail 15 correspond to the positions of the locking means 45 in the case that the control unit 19 occupies the connection and test positions, respectively. The reciprocally movable engagement member 47 engages and disengages from the second locking aperture 15b when the control unit 19 occupies the test position as shown in FIG. 6. When the control unit 19 occupies the connection position, the engagement member 47 engages and disengages from the first locking aperture 15a.

The control unit 19 is conventionally provided with control equipments such as an electromagnetic contactor and a control relay, neither shown, other than the moulded case circuit breaker 34.

The operation of the control unit withdrawing mechanism will now be described.

Figure 8:
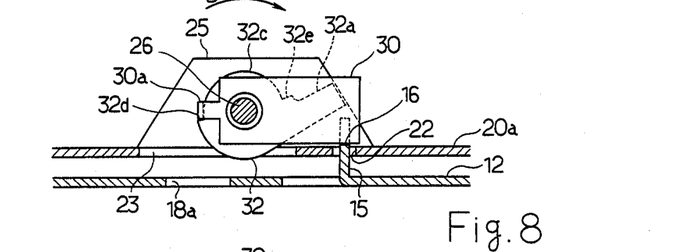
FIGS. 8–11 are partially enlarged front views of the control unit employed for explaining the operations of the locking member and engagement strip.
Figure 11:
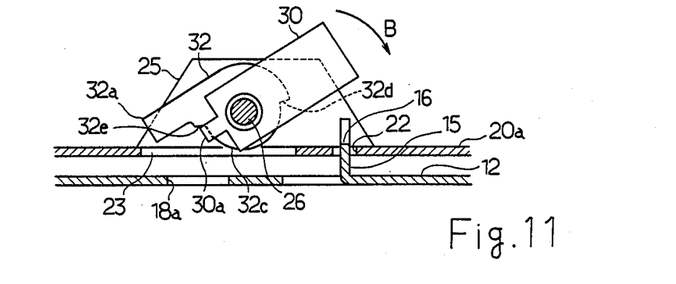

(1) The operation of locking the control unit 19 in the connection position in the unit compartment 13 will be described first. The rotation shaft 26 is moved with a screw driver or the like so that the lever 30 occupies the position shown in FIG. 11, where the distal end thereof is directed obliquely upwardly to the right. When the lever 30 occupies this position, the lever 30 and engagement member 32 may be prevented from interfering with the guide rail 15 and shelf 12 in the event that the control unit 19 is to be disposed in the unit compartment 13. The control unit 19 is thus disposed in the unit compartment 13 with the guide rail 15 on the shelf 12 inserted into the guide groove 22 of the unit frame 20, whereby a contact 21 is connected to the vertical bus 14a. See FIG. 5. When the rotation shaft 26 is moved in the direction of arrow B under the state of condition shown in FIG. 11, the lever 30 is moved in the direction of arrow B as shown in FIG. 8. The lever 30 engages the rear engagement region 16 of the guide rail 15, as shown in FIG. 5. Further rotational movement of the shaft 26 in the direction of arrow B moves the lever 30 forwardly owing to threadable engagement of the screw 28 with the threaded aperture 31, thereby forcing the lever 30 to abut against the front end of the rear engagement portion 16. The control unit 19 is thus locked in the connection position. When the lever 30 is moved from the position in FIG. 11 to the position in FIG. 8, the working strip 30a urges the end 32e of the cutout portion 32c of the engagement strip 32 in the direction of arrow B, whereby the engagement strip 32 is moved in the direction of arrow B with the rotational movement of the lever 30. When the engagement strip 32 passes the point where the tongue-shaped portion 32a thereof stands nearly vertically, the center of gravity of the engagement strip 32 exceeds the center of the rotation shaft 26. The gravity of the engagement strip 32 causes the same to further move in the direction of arrow B. The engagement strip 32 is stopped when the end 32d of the cutout portion 32c collides with the working strip 30a of the lever 30. See FIG. 8.

Figure 9:
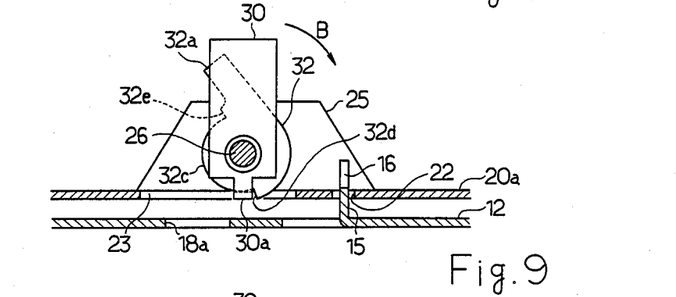
Figure 10:
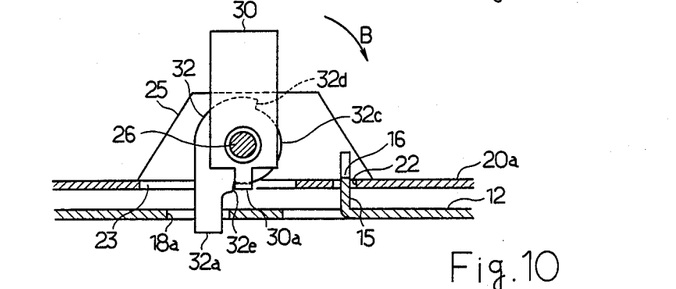

(2) The movement of the control unit 19 from the connection position to the test position will be described. When the rotation shaft 26 is moved by approximately 90° in the direction opposite to arrow B under the condition that the control unit 19 is locked in the connection position as shown in FIG. 8, the threadable engagement of the threaded portion 28 with the threaded aperture 31 slightly moves the lever 30 rearwardly, thereby disengaging the lever 30 from the front end of the rear engagement portion 16. When the lever 30 is moved in the direction opposite to arrow B together with the rotation shaft 26, the lever 30 disengages from the rear engagement portion 16 as shown in FIG. 9. The movement of the lever 30 in the direction opposite to arrow B causes the working strip 30a of the lever 30 to urge the end 32d of the cutout portion 32c, thereby moving the engagement strip 32 in the direction opposite to arrow B together with the lever 30. When the lever 30 and the engagement strip 32 pass the point where the lever 30 stands nearly vertically as shown in FIG. 9, the gravity of the engagement strip 32 further moves the same in the direction opposite to arrow B without movement of the lever 30. The tongue-shaped portion 32a of the engagement strip 32 is forced to move into the rear portion 18a of the positioning aperture 18. The end 32e of the cutout portion 32c collides with the working strip 30a, whereby the engagement strip 32 is stopped, as shown in FIG. 10.

Subsequently, when the control unit 19 is forwardly withdrawn so as to be moved to the test position under the condition shown in FIG. 10, the tongue-shaped portion 32a of the engagement strip 32 passes through the guide groove 18c and collides with the front end of the front end portion 18b of the positioning aperture 18, stopping at the test position. The control unit 19 thus occupies the test position.

When the rotation shaft 26 is moved in the direction of arrow B for the locking of the control unit 19 in the test position, the tongue-shaped portion 32a of the engagement strip 32 disengages from the front portion 18b of the positioning aperture 18 with movement of the lever 30. When the lever 30 is moved to the position where the same stands nearly vertically, the engagement strip 32 is moved in the direction of arrow B owing to its inercial force. The end 32d of the cutout portion 32c collides with the working strip 30a of the lever 30, which is caused to stop, whereby the same state of condition as shown in FIG. 8 is recovered. The lever 30 engages the front engagement portion 17 and is moved forwardly owing to threadable engagement of the threaded portion 28 with the threaded aperture 31, whereby the lever 30 is urged against the front end of the front engagement portion 17 to thereby lock the control unit 19 in the test position. See FIG. 6. When the control unit 19 occupies the test position, the contact element 21 is disconnected from the vertical bus 14a.

Figure 7:
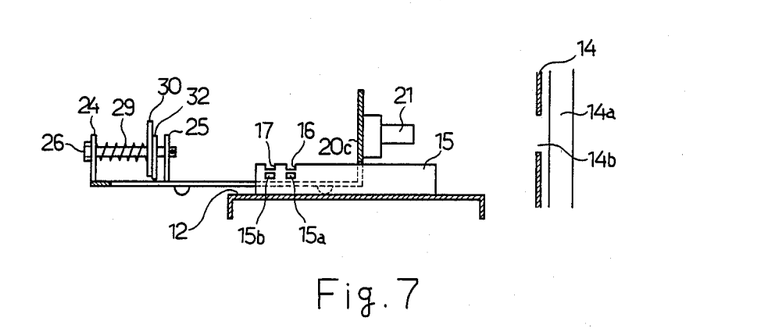

(3) Withdrawal of the control unit 19 from the unit compartment 13 will now be described. When the rotation shaft 26 is moved by approximately 30° in the direction opposited to arrow B under the condition that the control unit 19 is locked in the connection or test position, the threadable engagement of the threaded portion 28 with the threaded aperture 31 moves the lever 30 slightly rearwardly, thereby disengaging the lever 30 from the front end of the rear or front engagement portion 16 or 17. The lever 30 and the engagement strip 32 are moved in the direction opposite to arrow B together with the rotation shaft 26, so that the lever 30 is completely escaped from the rear or front engagement portion 16 or 17 and the tongue-shaped portion 32a of the engagement strip 32 is held so as not to enter the positioning aperture 18. The control unit 19 is then withdrawn forwardly from the unit compartment 13. See FIG. 7.

According to the above-described embodiment, the engagement strip 32 is moved together with the lever 30. When the engagement strip 32 passes a predetermined point, the gravity of the engagement strip 32 causes the same to further move in spite that the movement of the lever 30 is stopped, whereby the engagement strip 32 is allowed to enter the positioning aperture 18. Rotational angle of the rotation shaft 26 may be reduced to the extent that the lever 30 engages and disengages from the front and rear engagement portions 16 and 17 respectively, where the rotation shaft 26 is moved by approximately 90°. Furthermore, since one rotational movement of the shaft 26 allows the lever 30 to release from the rear or front engagement region 16 or 17 with the engagement strip 32 securely located in the positioning aperture 18, the control unit 19 may securely be positioned and locked in the predetermined position. Accordingly, the possibility that the control unit 19 is caused to inadvertently fall from the unit compartment 13 may be eliminated, thereby improving the security.

(4) The operation of the safety lock mechanism will now be described. When the operation handle 35 is turned in the direction of arrow C in FIG. 12 to OFF position under the condition where the control unit 19 occupies the test position as shown in FIG. 6 or the connection position as shown in FIG. 5, the pin member 36 eccentrically provided on the backside of the handle 35 is moved downwardly as shown in FIG. 13, whereby the actuating member 37 is moved in the clockwise direction in FIG. 13 about the shaft 38. The operation lever 41 of the circuit breaker 34 fitted in the opening 40 of the actuating member 37 is urged downwardly, thereby electrically opening the circuit breaker 34. Simultaneously, since the actuating member 37 is disconnected from the end 44c of the inner tube 44b of the release wire 44, the spring force of the compression coil spring 48 causes the engagement member 47 of the locking means 45 to be urged in the direction of arrow D as shown in FIG. 13 so that the engagement member 47 is rendered nearly coplanar with the end plate 46c of the frame 46. In this condition, the engagement member 47 may disengage from the first or second locking aperture 15a or 15b. When the operation shaft 26 is moved to disengage the lever from the rear or front engagement portion 16 or 17 under this condition, the control unit 19 may be movable forwardly and rearwardly within the unit compartment 13.

When the operation handle 35 is turned in the direction opposite to arrow C to ON position under the condition shown in FIG. 13, the pin member 36 is moved upwardly, thereby moving the actuating member 37 in the direction opposite to arrow C. The lever 41 fitted in the opening 40 of the actuating member 37 is moved upwardly, thereby electrically closing the circuit breaker 34. The actuating member 37 abuts against the end 44c of the inner tube 44b of the release wire 44, which end 44c is raised. The other end of the inner tube 44b urges the engagement member 47 of the locking means 45 in the direction opposite to arrow D against force of the compression spring 48. The engagement member 47 is then projected out of the frame 46 and engages the first or second locking aperture 15a or 15b, whereby the control unit 19 is locked in the position.

When the operation handle 35 is turned in the direction opposite to arrow C with the intention of setting the same at ON position under the condition that the control unit 19 occupies any position other than the test and connection positions, the actuating member 37 is moved in the direction opposite to arrow C in the same manner as described above. The end 44c of the inner wire portion 44b of the release wire 44 is raised and the other end thereof urges the engagement member 47 of the locking means 45 in the direction opposite to arrow D against force of the compression spring 48, thereby projecting out of the frame 46. However, when the distal end of the engagement member 47 abuts against the side surface of the guide rail 15, further turning of the operation handle 35 may be prevented and accordingly, the circuit breaker 34 is not closed.

The above-described safety lock mechanism allows the engagement member 47 to engage the first or second locking apertue 15a or 15b in response to the turning of the operation handle 35 to ON position only when the control unit 19 occupies either the connection or test position, thereby locking the control unit 19 in either of the positions. Consequently, the control unit 19 may be prevented from being withdrawn in the condition that the control unit 19 is connected to the vertical bus 14a as shown in FIG. 5. Furthermore, the control unit 19, connected to a testing power source, may be prevented from being withdrawn or being further moved inwardly from the test position when the control unit 19 is being tested with the circuit breaker 34 closed as shown in FIG. 6.

In the above-described embodiment, the moulded case circuit breaker 34 is closed when the control unit 19 occupies not only the connection position but also the test position. The reason for this is that the circuit breaker 34 is provided with an auxiliary contact connected to the control circuit to thereby interlock the main circuit and the control circuit. In this case, the control circuit cannot be supplied with electrical power from the testing power source unless the auxiliary contact is closed with the circuit breaker electrically closed. In the case that the main circuit and the control circuit need not be interlocked, the circuit breaker is not required to be electrically closed when the control unit 34 occupies the test position, whereby the construction of the locking means 45 as described above for preventing the control unit 34 from being moved from the test position to the connection position may not be required.

The foregoing disclosure and drawings are merely illustrative of the principles of the present invention and are not to be interpreted in a limiting sense. The only limitation is to be determined from the scope of the appended claims.

What is claimed is:

1. A control unit withdrawing mechanism for a metal-clad switchgear wherein a control unit including equipment for controlling electric power loads is provided in a unit compartment of the switchgear for movement between a connection position where the control unit is connected to a power source bus and a test position where the control unit is disconnected from the power source bus, said control unit withdrawing mechanism comprising:
   (a) locking means for locking the control unit in the connection and test positions, said locking means comprising:
      (1) front and rear engagement portions formed in a bottom shelf of the unit compartment so as to correspond to the test and connection positions respectively;
      (2) a locking member reciprocally rotatably mounted on the control unit, said locking member being moved when the control unit is occupying either the connection or test position and engaging said rear and front engagement portions so that the control unit is locked in either the connection or test position, respectively; and
(b) positioning means for positioning the control unit at either the connection or test position, said positioning means comprising:
(1) a positioning aperture formed in the bottom shelf of the unit compartment and having a predetermined length; and
(2) an engagement member movable within said positioning aperture when the control unit is moved within the unit compartment so as to limit the movement of the control unit to a section between the connection and test positions, said engagement member rotatably mounted on a shaft at the control unit side so as to be moved in response to movement of said locking member, thereby entering and withdrawing from said positioning aperture, said engagement member further moving due to gravity after the movement of said locking member is interrupted when said engagement member passes a predetermined point, thereby entering said positioning aperture.

2. A control unit withdrawing mechanism for a metal-clad switchgear wherein a control unit including a circuit breaker having an operation handle for on-off operation thereof is provided in a unit compartment of the switchgear for movement between a connection position where the control unit is connected to a power source bus and a test position where the control unit is disconnected from the power source bus, said control unit withdrawing mechanism comprising:
(a) a guide rail disposed vertically from a bottom shelf of the unit compartment for guiding the control unit moving within the unit compartment;
(b) locking means for locking the control unit in the connection and test positions, said locking means comprising:
(1) front and rear engagement portions formed in an upper edge portion of said guide rail so as to correspond to the test and connection positions respectively;
(2) a locking member reciprocally rotatably mounted on the control unit, said locking member being moved when the control unit is occupying either said connection or test position and engaging said rear and front engagement portions so that the control unit is locked in either the connection or test position, respectively;
(c) positioning means for positioning the control unit at either the connection or test position, said positioning means comprising:
(1) a positioning aperture formed in the bottom shelf of the unit compartment and having a predetermined length;
(2) an engagement member movable within said positioning aperture when the control unit is moved within the unit compartment so as to limit the movement of the control unit to a section between the connection and test positions, said engagement member being rotatably mounted on a shaft on a side near the control unit so as to be moved in response to movement of said locking member, thereby entering and withdrawing from said positioning aperture, said engagement member further moving due to gravity after the movement of said locking member is interrupted when said engagement member passes a predetermined point, thereby entering said positioning aperture; and
(d) a safety lock mechanism comprising a locking opening formed in a side wall of said guide rail so as to correspond to the rear engagement portion corresponding to the connection position, a frame provided on the control unit, an engagement member provided on the frame so as to be reciprocally movable in a horizontal direction and so as to engage said locking opening when moved, and a release wire provided between a side near the circuit breaker and the engagement member so as to be reciprocally moved with a rotative movement of an operation handle,
whereby the engagement member is moved to thereby engage the locking opening when the operation handle is moved toward an on-position.

* * * * *